(12) United States Patent
Bonatto et al.

(10) Patent No.: US 9,457,894 B2
(45) Date of Patent: Oct. 4, 2016

(54) VARIABLE-WIDTH AERODYNAMIC DEVICE

(71) Applicant: EMBRAER S.A., São José dos Campos—SP (BR)

(72) Inventors: André dos Santos Bonatto, São José dos Campos (BR); Francisco Keller Klug, São José dos Campos (BR); Julio Romano Meneghini, São José dos Campos (BR); Leandro Guilherme Crenite Simões, São José dos Campos (BR); Miacel Gianini Valle Do Carmo, São José dos Campos (BR); Rafael dos Santos Gioria, São José dos Campos (BR); Stergios Pericles Tsiloufas, São José dos Campos (BR)

(73) Assignee: EMBRAER S.A., São José dos Campos—SP (BR)

( * ) Notice: Subject to any disclaimer, the term of this patent is extended or adjusted under 35 U.S.C. 154(b) by 249 days.

(21) Appl. No.: 14/136,350

(22) Filed: Dec. 20, 2013

(65) Prior Publication Data

US 2014/0217236 A1    Aug. 7, 2014

(30) Foreign Application Priority Data

Dec. 21, 2012   (BR) .............................. 102012032959

(51) Int. Cl.
| | | |
|---|---|---|
| *B64C 23/06* | (2006.01) | |
| *B64C 23/00* | (2006.01) | |
| *B64C 7/00* | (2006.01) | |
| *B64C 9/18* | (2006.01) | |
| *B64C 9/02* | (2006.01) | |

(52) U.S. Cl.
CPC ................. *B64C 23/00* (2013.01); *B64C 7/00* (2013.01); *B64C 9/02* (2013.01); *B64C 9/18* (2013.01); *B64C 2230/14* (2013.01)

(58) Field of Classification Search
CPC ...................................................... B64C 23/065
USPC ............................................... 244/1 N, 199.4
See application file for complete search history.

(56) References Cited

U.S. PATENT DOCUMENTS

| | | | | |
|---|---|---|---|---|
| 6,722,615 | B2* | 4/2004 | Heller et al. ............... | 244/199.4 |
| 7,874,524 | B2* | 1/2011 | Lee et al. ................... | 244/199.4 |
| 7,900,876 | B2* | 3/2011 | Eberhardt .................. | 244/199.4 |
| 7,988,100 | B2* | 8/2011 | Mann ......................... | 244/199.4 |
| 8,382,041 | B1* | 2/2013 | Yechout ..................... | 244/199.4 |
| 8,439,313 | B2* | 5/2013 | Rawdon et al. ........... | 244/199.4 |
| 8,651,431 | B1* | 2/2014 | White et al. ................ | 244/218 |

* cited by examiner

*Primary Examiner* — Brian M O'Hara
*Assistant Examiner* — Keith L Dixon
(74) *Attorney, Agent, or Firm* — Nixon & Vanderhye P.C.

(57) ABSTRACT

There is described a variable-width aerodynamic device (10) associable to aerodynamic high lift structures (30), the variable-width aerodynamic device (10) comprising: a main body (11) substantially flat and having constant thickness; a first longitudinal edge (12) associated to the aerodynamic high lift structure (30); and a second non-rectilinear longitudinal edge (13), forming, with the first longitudinal edge (12), a variable width (Lv) along its length.

6 Claims, 3 Drawing Sheets

VARIABLE-WIDTH AERODYNAMIC DEVICE

This application claims priority to BR Application No. 102012032959-0, filed 21 Dec. 2012, the entire contents of which are hereby incorporated by reference.

The present invention refers to a variable-width aerodynamic device, used to reduce aerodynamically-generated noise in aircraft, in particular noise on aerodynamic surfaces, such as flaps, slats, ailerons, spoilers and aerofoils in general.

DESCRIPTION OF THE PRIOR ART

Noise is a source of inconvenience for the population and some of the main causes are related to means of transport in general. In aviation, the noise emitted when a plane lands and takes off is currently one of the main environmental issues that have received technological and regulatory attention.

Both civilian and military aircraft are equipped with aerofoils that generate lift and generate aerodynamic noise during the take-off and/or landing phases of a flight.

A significant portion of noise generated by an aircraft during its operation is due to the stream of air on the contours of the surfaces of the aircraft. This type of noise is generally called aerodynamic noise and is caused largely by the air that streams over the aerodynamic surfaces of the aircraft and also by the discontinuities that these control surfaces cause on the wings of the aircraft.

The difference in pressure between the air that streams between the lower wing and the upper wing at the ends of these surfaces generates a "flight" of air from the region of greater pressure (lower wing) to the region of lower pressure (upper wing), generating a main vortex and, consequently, significant noise.

In the approach and landing phase of a flight, aerodynamic noise becomes more important due to the proximity of the ground and high lift devices, slats and flaps, as well as the landing gear being down.

The solution to this problem has been the focus of various studies around the world.

In this sense, current approaches to solve this problem consist of installing vortex-generating elements at the ends (edges) of the control surfaces of the aircraft. These elements generate small vortexes which are designed to weaken the main vortex that would be generated there in these parts of the aircraft (causing significant noise), whereby reducing the aerodynamic noise. The solutions of the state of the art relating to noise of the side ends (edges) of the flaps involve elements such as fences, bristles and rods to achieve this vortex modifying effect.

Document U.S. Pat. No. 5,738,298 teaches in greater detail the use of fences which are simply perpendicular side plates mounted on the side edge of the flap. In this solution, the plate may protract on the stream only on the under sided of the flap, only on the upper side or in both directions. With the fences, the fusion process between the lower and upper vortex subsystems is avoided as is also the interaction of the vortex merged with the suction surface of the flap. As a consequence, the noise emission is reduced. However, for aircraft that are already in operation, installing the fences on the flaps sometimes may not be executed such that they are positioned in alignment with the stream direction. As a result, there is the penalty of drag during cruise conditions.

Document U.S. Pat. No. 6,491,260 describes the application of porous side edges or bristles (elongated elements) on the side surfaces of the flaps. In this solution the porous material acts as an acoustic absorber, the stable outflow stream completely changes the local average stream field and the associated double vortex system. The latter mechanism is also valid when bristles are used on the side edges of the flap. However, the drawbacks are related to the need to have a gap between the main wing and the control surface (flap) to make room for the porous material or bristles when the flap is retracted (cruise configuration).

The application of rods and comb-like arrangements on the row of side edges of the flaps presents the same drawbacks as the bristles and porous side edges: when the control surface of the flap is retracted, there is not enough space to accommodate the rods.

Another system of seals is described in document U.S. Pat. No. 7,874,524, with the difference that this document refers to a multi-segment set of seals disposed along the wing, both on the upper wing and on the lower wing, and that can move in relation to the flap.

Document U.S. Pat. No. 7,753,316 also describes a system of seals crosswise to the direction of the flap span which move according to the variation of local stream temperature at certain measuring points along the flap. This system helps maintain optimal conditions also during cruise, not just at take-off and landing.

Document US 2010/0294883 is based on a perforated seal, which maintains a controlled local stream on the lower wing and upper wing of the profile in the region of the side surface of the flap. This seal acts as an acoustic damper, which changes the speed fields, breaking the structure of the large tip vortex into various reduced-size vortexes, reducing the efficiency of the acoustic source.

Despite being effective in its purpose to reduce noise, most of the known solutions are hard to install on aerofoils, without penalties to drag in other flight conditions.

OBJECTIVES OF THE INVENTION

The objective of the present invention is to provide a variable-width aerodynamic device to seal the discontinuities between mobile parts of the aircraft so as to diminish the noise considerably.

It is also an objective of this invention to provide a variable-width aerodynamic device endowed with geometry capable of maximally attenuating the noise in the frequency range of interest.

BRIEF DESCRIPTION OF THE INVENTION

The object of the invention is a variable-width aerodynamic device associable to aerodynamic high lift surfaces, the variable-width aerodynamic device comprising a main body substantially flat and having constant thickness, a first longitudinal edge associated to the aerodynamic high lift surface, and a second non-rectilinear longitudinal edge, forming, with the first longitudinal edge, a variable width along its length.

BRIEF DESCRIPTION OF THE DRAWINGS

The present invention will now be described in greater detail based on an example of execution represented in the drawings. The drawings show.

DETAILED DESCRIPTION OF THE INVENTION

Environmental issues arise as major and hard technological challenges for the growth of the aeronautical industry in the world. Among various environmental concerns, aircraft noise has constantly grown in importance over recent years, and today it is one of the most important challenges to be overcome, in order to enable a continuous increase in aircraft in operation in the world.

Communities living in the proximity of airports throughout the world, concerned with improvement in living quality, have put pressure on government authorities to decrease the noise generated by the traffic of aircraft. This pressure is converted into noise limits increasing restrictive of certification, which is a concern for new planes, and noise limits for operating aircraft at airports, resulting in a concern for aircraft already in operation.

This is why studies and research seeking technical solutions that decrease the noise of aircraft have significantly increased over recent years, and the invention now disclosed is the result of this effort.

Figure 3A:
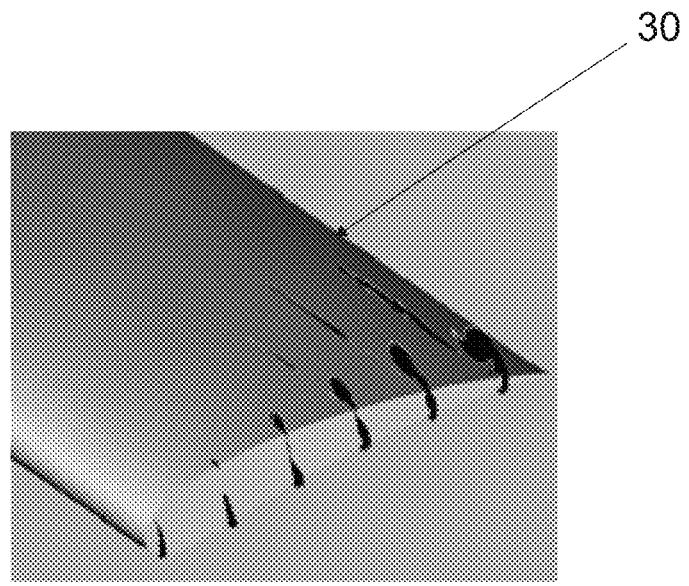
FIGS. 3a and 3b—are schematic views illustrating the behavior of tip vortexes in an aerodynamic high lift structure containing the variable-width aerodynamic device that is the object of this invention and in an aerodynamic high lift structure without the aerodynamic device.

The aerodynamic noise generated by an aerodynamic high lift structure 30 is predominantly due to the vortex formed on the tip of this structure, whose formation is attributed to the difference between the pressures on the lower wing and on the upper wing of the profile, as illustrated in FIG. 3a.

Figure 1:
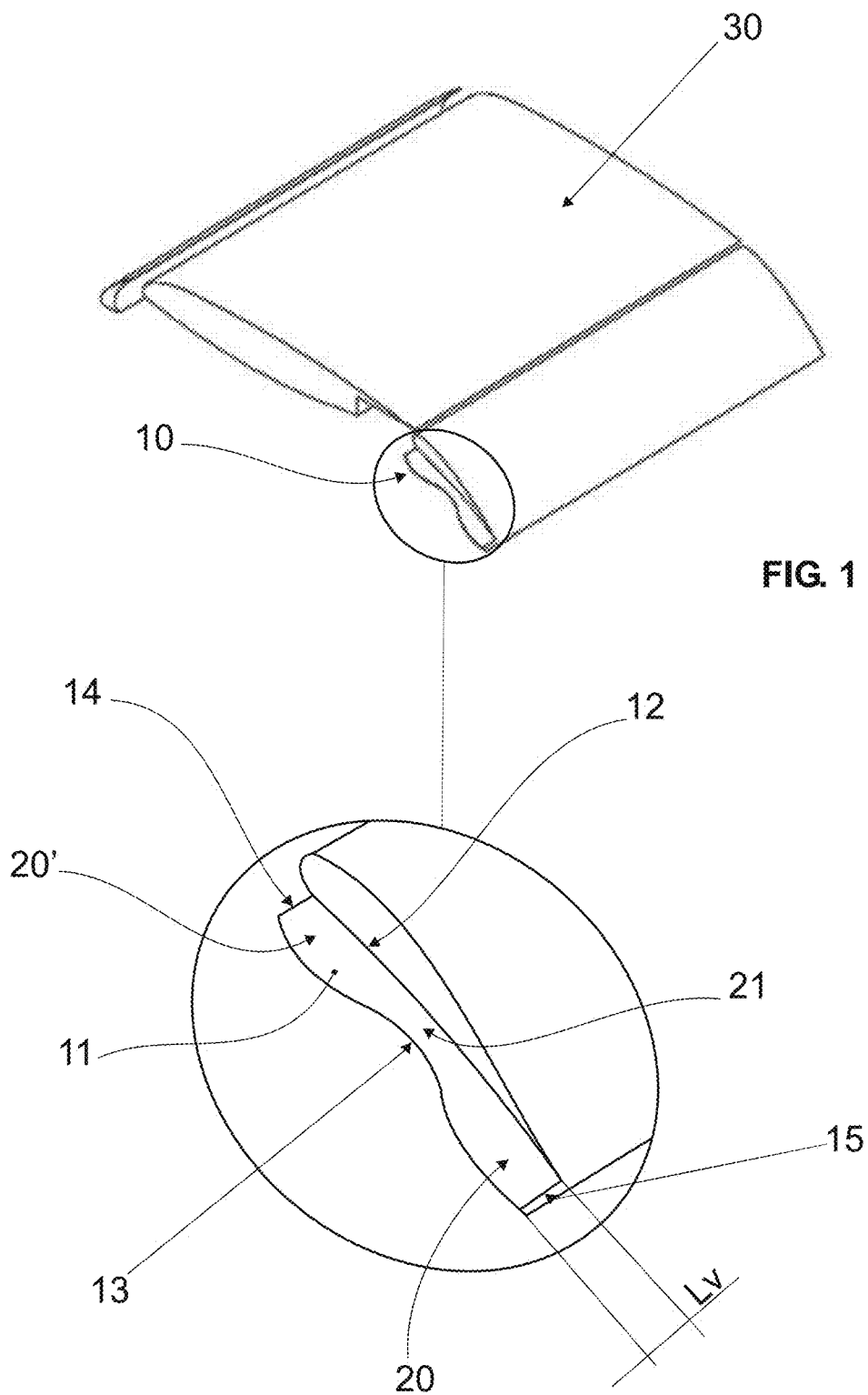
FIG. 1—is a schematic view of the variable-width aerodynamic device that is the object of this invention, associated to a first example of aerodynamic high lift structure.

Therefore, according to a preferred embodiment and as can be seen in FIG. 1, the variable-width aerodynamic device 10, that is the object of this invention, is associable to aerodynamic high lift structures 30, and in this first example the aerodynamic high lift structure 30 is a flap. Particularly, the variable-width aerodynamic device 10 is fixed on the side surface of the flap 30 so as to hinder communication between the different pressure regions, mitigating the formation of this tip vortex.

This variable-width aerodynamic device 10 comprises a main body 11 substantially flat and having constant thickness. A first longitudinal edge 12 is associated to the aerodynamic high lift structure 30 and a second non-rectilinear longitudinal edge 13, forming, with a first longitudinal edge 12, a variable width Lv along its length.

More particularly, the variable-width aerodynamic device 10 consists of a blade 11 comprising a first longitudinal edge 12 set to the aerodynamic high lift structure 30, a second longitudinal edge 13 parallel apart from the first longitudinal edge 12 and crosswise edges 14, 15 perpendicularly associating the first longitudinal edge 12 to the second longitudinal edge 13.

This second longitudinal edge 13 is free of rigid fixing, non-rectilinear, and forms, with the first longitudinal edge 12, at least a portion of larger width 20 and at least a portion of smaller width 21 along its length. Preferably, the second non-rectilinear longitudinal edge 13 forms, with the first longitudinal edge 12, two portions of larger width 20, 20' and at least a portion of smaller width 21 along its length. However, these arrangements are only examples of geometry for the device 10, other different forms are provided that they enable the same technical advantages to be obtained.

Figure 2:
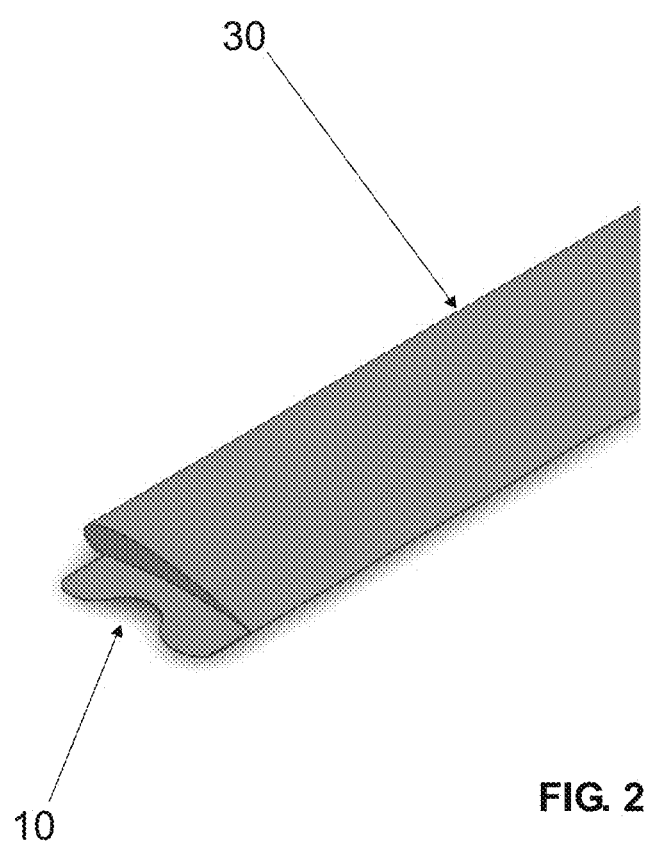
FIG. 2—is a schematic view of the variable-width aerodynamic device that is the object of this invention, associated to a second example of aerodynamic high lift structure.

FIG. 2 illustrates the variable-width aerodynamic device 10 that is the object of this invention, associated to a second example of aerodynamic high lift structure 30 which consists of an aerofoil. In this case, the variable-width aerodynamic device 10 comprises the same characteristics described for the first example of aerodynamic high lift structure 30 above.

Figure 3B:
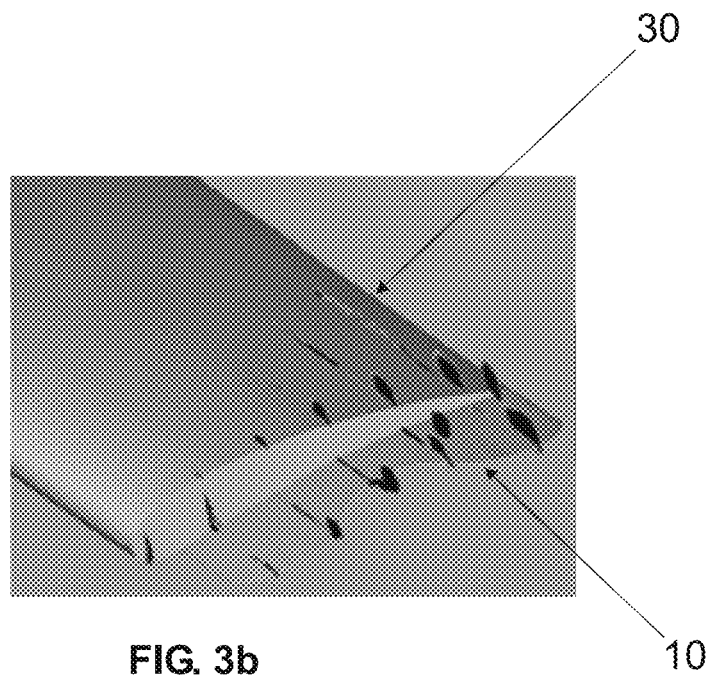

As illustrated in FIG. 3b, the variable-width aerodynamic device 10 acts to create a barrier between the fluid of the lower wing and of the upper wing, hindering the formation of the tip vortex. Additionally, the variable width of this device 10 distorts the main vortex structure, increasing its dissipation. Accordingly, the device 10 separates the vortex formed on the side surface from the one formed on the upper wing, making it harder from them to join, diminishing the intensity.

The variable-width aerodynamic device 10 is secured, by means of rivets, welding or other method imaginable, to the side surface of the aerodynamic high lift structure 30, such as a flap or aerofoil, on the lower wing or upper wing. The device 10 comprises fixed thickness, but a variable width along its length.

It is therefore important to emphasize that the variable-width aerodynamic device 10, that is the object of the present invention, is associated to the aerodynamic high lift mobile structures 30 and with these incase when in retracted position and this is why it does not generate any increase in drag in this arrangement.

When the mobile structure 30 is extended, the device 10 hinders interaction between the high and low pressure regions of the profile (lower wing and upper wing, respectively), reducing the tip vortex, which is the largest generator of aerodynamic noise of this type of structure 30. The variation in the width of the device 10 results in the generation of vorticity in the crosswise direction to the stream, another way of dissipating the tip vortex.

Having described an example of a preferred embodiment, it should be understood that the scope of the present invention encompasses other possible variations, being limited solely by the content of the accompanying claims, potential equivalents being included therein.

The invention claimed is:

1. A wing comprising an aerodynamic high lift mobile structure having leading and trailing edges, and a variable-width aerodynamic device attached to the aerodynamic high lift mobile structure, wherein the variable-width aerodynamic device comprises:

a substantially flat main body member of constant thickness attached to and extending laterally outwardly from a side region of the aerodynamic high lift mobile structure, wherein the main body member includes (i) forward and rearward crosswise edges extending parallel to the leading and trailing edges of the aerodynamic high lift mobile structure, (ii) a first longitudinal edge adjacent the side region of the aerodynamic high lift mobile structure and extending between the forward and rearward crosswise edges, and (iii) a second longitudinal edge laterally spaced from the first longitudinal edge and extending between the forward and rearward crosswise edges, and wherein, the second longitudinal edge is non-rectilinear along a lengthwise extent thereof between the forward and rearward crosswise edges so as to establish variable widthwise dimensions of the main body member with the first longitudinal edge and thereby define respective portions of the main body member having larger and smaller widthwise dimensions along the lengthwise extent thereof.

2. The wing of claim 1, comprising the aerodynamic high lift mobile structure, wherein the second longitudinal edge is a free unfixed edge of the main body member.

3. The wing of claim 1, comprising the aerodynamic high lift mobile structure, wherein the main body member is blade comprising the first and second longitudinal edges, and the forward and rearward and crosswise edges, and wherein the first and second longitudinal edges are perpendicularly oriented relative to the forward and reward crosswise edges.

4. The wing of claim 1 comprising the aerodynamic high lift mobile structure, wherein the second non-rectilinear longitudinal edge, establishes with the first longitudinal edge, two larger widthwise dimension portions and at least one smaller widthwise dimension portion therebetween.

5. The wing of claim 1 comprising the aerodynamic high lift mobile structure, wherein the aerodynamic high lift mobile structure is selected from aircraft flap structures and aircraft aileron structures.

6. An aircraft which comprises the aerodynamic high lift mobile structure as claimed in claim 1.

* * * * *